Sept. 8, 1964     E. WILDHABER     3,147,535
ROTARY GEAR-SHAPED TOOL FOR PERFECTING GEARS
AND METHOD AND MEANS FOR USING THE SAME
Filed Nov. 25, 1960     2 Sheets-Sheet 1

INVENTOR:
Ernest Wildhaber

United States Patent Office 3,147,535
Patented Sept. 8, 1964

3,147,535
ROTARY GEAR-SHAPED TOOL FOR PERFECTING GEARS AND METHOD AND MEANS FOR USING THE SAME
Ernest Wildhaber, Brighton, N.Y.
(124 Summit Drive, Rochester 20, N.Y.)
Filed Nov. 25, 1960, Ser. No. 71,741
11 Claims. (Cl. 29—103)

The present invention relates to rotary gear-shaped tools for perfecting preformed gears, and to methods and means for using the same. The tools may be embodied as shaving tools, laps, abrading tools in general, and others. The gears may be preformed by forging, pressing, rolling, casting and in other known ways. The novel tool and method serves to refine such gears, so that the resulting gears will be formed to closer tolerances.

One object of the present invention is to devise tools and a method for perfecting external and internal gears, that can be applied close to a shoulder. A further object is to achieve high quality gears of increased strength, whose shape could hitherto be achieved only with processes requiring ample tolerances and resulting in lesser quality.

A further aim is to improve gear pairs whose axes lie in a common plane, and particularly pairs of cylindrical gears with straight or helical teeth, whose gear axes are parallel. Another aim is to perfect herringbone gears having continuous teeth, and having no gap between the teeth of opposite hand.

A still other object is to devise a shaving method or abrading or correcting method in which the tool is positively timed to the workpiece, to achieve improved results. Conventionally no positive timing is used in known methods of this kind; and the success of the conventional method depends to a large extent on the duration of contact of the individual gear teeth. The positively timed tool avoids this dependence.

Furthermore a simple machine for use of the novel tool shall be devised, wherein positive timing is achieved with only two gear pairs.

Other objects will appear in the course of the specification and in the recital of the appended claims:

Figures 4, 6:
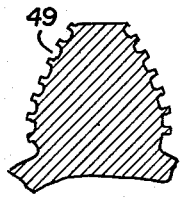
Figure 5:
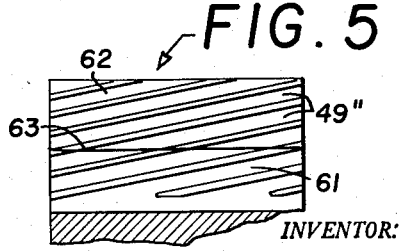

FIG. 4 and FIG. 5 are each a peripheral view and fragmentary axial section of my tool as embodied as a shaving tool. FIG. 4 refers to a tool with helical teeth adapted to contact the final tooth surfaces of the workpiece along lines inclined to the lengthwise direction of the teeth, such as along a line 60. FIG. 5 refers to a tool with straight teeth parallel to the tool axis, where the lines of instantaneous contact are parallel to the lengthwise direction of the teeth, like line 63.

FIG. 6 is a cross-section of a tooth of a shaving tool.

Figure 7:
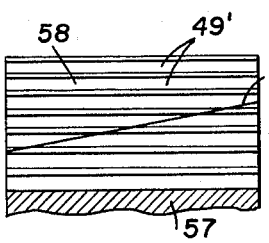

FIG. 7 is a fragmentary axial section showing an internal gear such as may be perfected with the tool and process of the invention, and having teeth (64) merging without gap with the side wall (65) of the internal gear.

Figure 3:
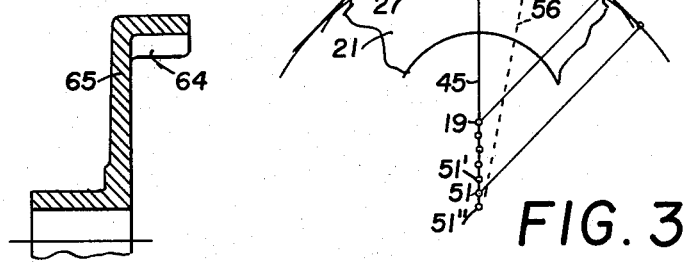
FIG. 3 is a fragmentary axial view of an internal rotary gear-shaped tool constructed according to the invention, shown in engagement with the external gear also shown in FIG. 1, and a diagram further explaining the invention.
Figure 8:
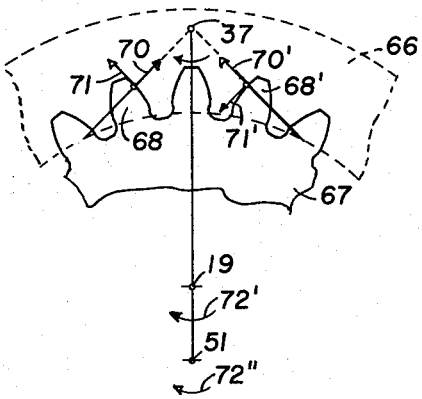

FIG. 8 is a diagram similar to FIG. 3 further explaining the action of the novel tool.

Figure 9:
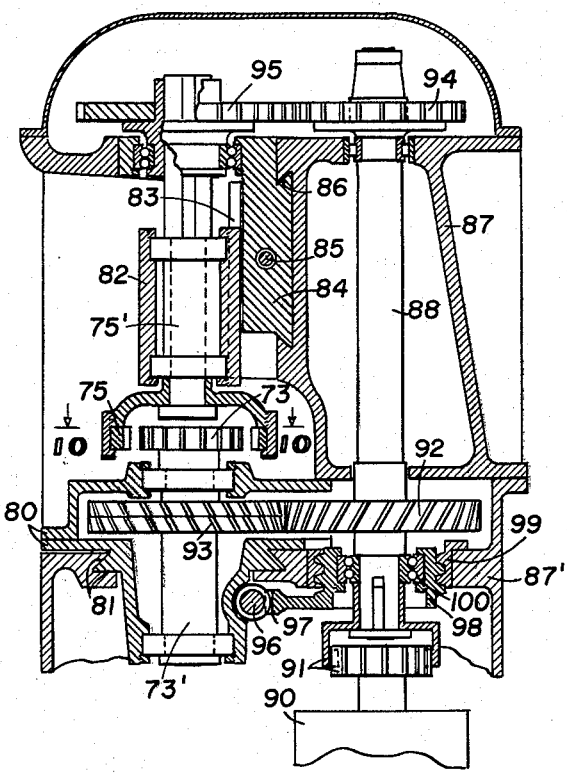

FIG. 9 is a simplified and diagrammatic axial section of an apparatus or machine for use of my novel tool.

Figure 10:
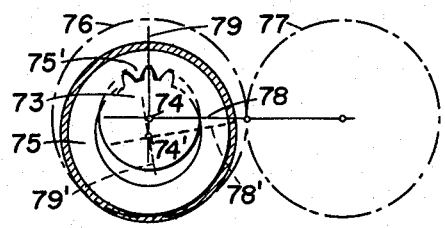

FIG. 10 is a diagrammatic section along lines 10—10 of FIG. 9, looking in the direction of the arrows, and explanatory of a timing change that occurs with the depthwise feed and is compensated in the machine shown in FIG. 9.

The invention is applicable to all tooth shapes. It will be particularly described as applied to involute gears having parallel axes. The gear pair shown in FIG. 1 comprises an internal gear 20 and an external gear or pinion 21 meshing therewith. The gear teeth 22, 23 contain involute side profiles 24, 25, which are involutes of base circles 26, 27 respectively.

As the gears rotate in engagement with one another on their axes 18, 19 their tooth profiles contact at a moving point (28) that describes in space a straight line of action 30. Line 30 is tangent to the base circles 26, 27 at points 29', 29''. The opposite side of the teeth has a line of action 30'. Lines 30, 30' pass through the pitch point 31, at which the axis of instantaneous relative motion intersects the drawing plane. The pitch point 31 is also the contact point of the pitch circles 32, 33 that roll on each other without sliding when considered moving with the respective gears. The tooth action extends between end points 28', 28'' on the outside circle 34 of the pinion and the circle constituted by the tooth ends of the internal gear respectively.

A rotary gear-shaped tool for the pinion should be capable of sweeping the profile 25 at least as far down as point 28''. And a tool for the gear should sweep the profile 24 at least as close to the tooth bottom as point 28'.

Conventional shaving tools, honing tools and lapping tools are set at an angle to the periphery of the gear to be perfected, to achieve some sliding at all portions of the tooth surfaces. A tool having its axis set parallel to the gear axis has no sliding at the radius of its pitch circle, or at the radius of its circle that rolls without sliding on a circle concentric with the gear. As these processes are based chiefly on stock removal by sliding action, reciprocatory motions were introduced in the past when parallel axes were to be used.

To perfect cylindrical gears the tool of the present invention is set with its axis parallel to the axis of the workpiece. For bevel gears the tool is set with its axis intersecting the axis of the gear. In both cases the axes lie in a common plane.

Sliding is introduced without additional reciprocation by a construction and disposition of the tool such that the axis of instantaneous relative motion is well outside of the tooth zone, using an external tool for an internal gear and an internal tool for an external gear.

Figure 2:
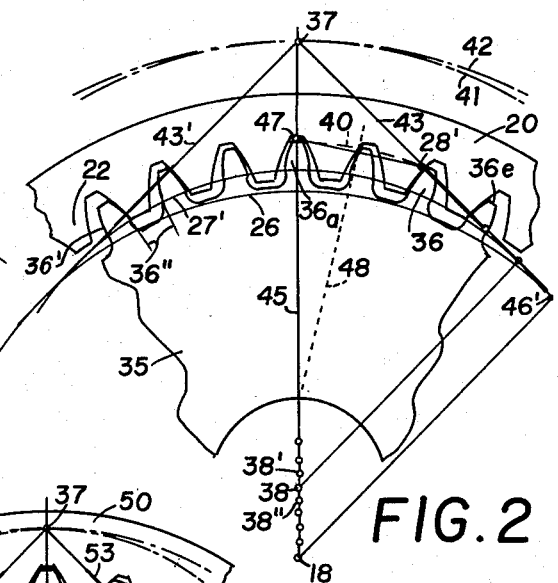
FIG. 2 is a fragmentary view of a rotary gear-shaped tool constructed according to the invention, shown in engagement with the internal gear also shown in FIG. 1, and a diagram explanatory of the principles underlying the invention.

FIG. 2 shows an external tool 35 for perfecting internal gear 20. If tool 35 is embodied as a shaving tool its tooth surfaces are grooved. In all cases its teeth 36 are designed to mesh with gear 20 so as to have an axis 37 of instantaneous relative motion at a larger distance from the tool axis 38 than the tooth zone of the tool, or than the outside surface 40 of its teeth.

As the tool and gear run together two circles 41, 42 rigid respectively with the tool and gear roll on each other without sliding, contacting at a point of the instantaneous axis 37. At any one instant the line of contact of a tooth side is the normal projection of the instantaneous axis 37 to the tooth side. On involute gears the path of contact of one side of the teeth is a straight line 43 passing through instantaneous axis 37 and tangent to the base circle 26 of gear 20. 43' is the path of contact between tool and gear on the opposite side of the teeth.

The profiles of teeth 36 are involutes of a base circle 27' that is also tangent to lines 43, 43'. The involute profiles of the tool may be slightly modified to produce gear profiles eased off at their ends.

Tooth sliding between the tool and gear at any point of contact is proportional to the turning velocity about the instantaneous axis 37, the difference of the turning velocities of the tool and internal gear. It is further proportional to the distance of the contact point from axis 37. With the present invention this distance is considerable and never zero, so that sliding exists at all points of contact. Moreover, this distance and sliding change only moderately along the path of contact.

In designing a tool 35 the inclination of the path of contact 43 to center line 45 may be assumed, and path 43 may then be drawn tangent to the given base circle 26 of gear 20. Path 43 intersects the center line at 37. Then point 28' is located in FIG. 2 on path 43 by plotting the distance 28'–29' of FIG. 1 from the point of tangency 46' of line 43 wiith base circle 26. A point 47 is also located that lies on the tooth bottom of the internal gear 20 and on center line 45. The dotted line 48 bisects the distance 28'–47 at right angles. In order to sweep the involute gear profile 24 down as close to the tooth bottom as point 28' the tool axis 38 should be between the dotted line 48 and the gear center 18.

The tooth number of the tool controls the position of the tool axis on center line 45. Positions 38, 38', 38" etc. thereon correspond to integral tooth numbers. The interval between adjacent positions is equal to the distance 18–37 divided by the tooth number of gear 20.

The opposite side of the teeth contacts along a path 43' symmetrical to path 43 with respect to center line 45. The involute profiles 36' of the tool can now be determined with the known methods of the gear art. If the teeth of the tool show thinner than desired, a tool center closer to the gear center 18 may be used. Or a different inclination of the path of contact 43 may be assumed, whereupon the described procedure is repeated.

It should be noted that the tooth thickness of the tool 35 at midheight of its teeth 36 is smaller than the space width there, preferably at least 30% smaller, and that the point width or thickness at the tooth ends 36e is less than half the width of the tooth bottom between the radially extended side profiles 36".

Also when the center line of a tooth (36a) of the tool coincides with the center line 45 between the tool and gear, tooth 36a is clear of the tooth space of the gear and without contact, while both sides of the gear teeth are contacted by other teeth of the tool. Tooth 36a comes closest to the gear profiles at its outer end.

Figure 1:
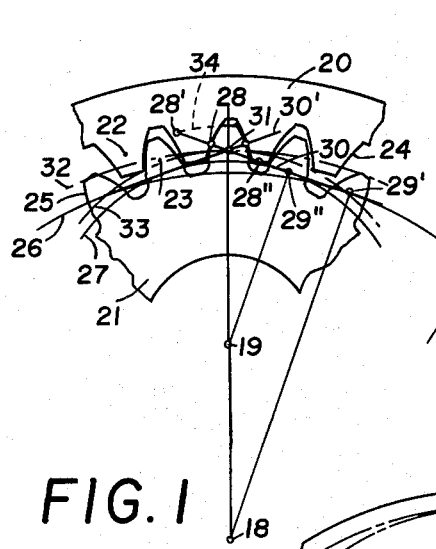
FIG. 1 is a fragmentary view of a pair of intermeshing gears having parallel axes, and a diagram used in explaining the invention.

FIG. 3 shows a rotary gear-shaped tool 50 for perfecting external gears, and particularly for perfecting the pinion or gear 21 shown in FIG. 1. The inclination of the path of contact 53 between tool 50 and gear 21 is assumed. Path 53 is tangent to the base circle 27 of gear 21, contacting it at 46". Its intersection 37 with the center line 45 locates the instantaneous axis of relative motion. The tool axis 51 lies on center line 45 in one of the marked positions 51, 51', 51" that correspond to integral tooth numbers of the tool. The distance between adjacent such positions is equal to the distance 19–37 divided by the tooth number of gear 21, where 19 denotes the gear axis.

Point 28" of FIG. 1 is transferred by plotting distance 28"–29" in FIG. 3 from point 46" on path 53. A point 54 on center line 45 is also considered. It lies on the root surface or tooth bottom of gear 21. Then the dotted line 56 may be drawn midway between the points 54, 28" at right angles to line 54–28". The tool axis 51 should be closer to the gear axis 19 than the intersection of line 56 with center line 45, to enable the tool to reach point 28".

The same procedure is used for other external gears or pinions. In each case point 28" is determined from the mating gear, whether it be an external or an internal gear.

The tooth thickness of the tool 50 at midheight of its teeth is smaller than the space width there; and the point width or thickness at the tooth end 59 is less than one quarter of the space width at said end. Also, when the center line of a tooth space of tool 50 is aligned with the center line 45 of the pair 21, 50, the tooth space clears the tooth of the gear therein and comes closest to it at the top of the gear tooth, while both sides of the gear teeth are in contact with the tool in different tooth spaces thereof.

A tool (35, 50) is preferably designed for the given gear it is to perfect. An external tool 35 for perfecting internal gears has a tooth number more than half that of the workpiece. An internal tool 50 has a tooth number less than double the tooth number of the workpiece.

The tools 35, 50 and the gears they perfect may have straight or helical teeth, or longitudinally curved teeth if desired. The teeth may be crowned. For crowning the teeth of the tool are made very slightly thicker towards their ends than they would be for teeth without crowning. To avoid uneven tool wear the gears are preferably preformed with crowned teeth when the final gears are to be crowned.

FIGS. 4 to 6 illustrate tools embodied as shaving tools, having grooves 49', 49" whose cross-section 49 is shown in FIG. 6. The tool 57 fragmentarily shown in FIG. 4 has helical teeth 58. These contact the gear to be shaved along oblique lines like line 60, that sweep the tooth surfaces as the tool and gear run together. I preferably use a direction of the grooves moderately inclined to the direction of the lines of instantaneous contact. Thus the grooves 49' on the helical teeth extend in the direction of the tooth length, following helices.

The tool 61 shown in FIG. 5 has straight teeth 62 parallel to its axis; and its instantaneous lines of contact with the workpiece are straight lines parallel to the tool axis, like line 63. In this case I preferably use grooves 49" inclined to the longitudinal direction of the teeth.

FIG. 7 illustrates an internal gear whose teeth 64 join the gear body and side wall 65 directly, without the customary groove. This makes for added strength and shorter face width. Such gears can be produced by forging or casting, but not to the close tolerances required on first-class gears. The present invention offers the required accuracy.

FIG. 8 shows the forces exerted on the internal member 66 centered at 51, by an external member 67 centered at 19. The internal member 66 may be either the tool or the workpiece. The load exerted by teeth 68, 68' on internal member 66 may be resolved into normal components 70, 70' and into tangential components 71, 71' that extend in the direction of sliding.

The normal components 70, 70' pass through the instantaneous axis 37. When they are equal their resulting turning moment exerted on member 66 is zero. They are approximately equal when the same amount of stock is removed from both sides of the teeth, as occurs with positive timing at least in the last stages of finishing.

The tangential components 71, 71' are shown for rotation in the direction of arrows 72', 72". They both exert turning moments opposite to arrow 72" on the internal member 66. These turning moments tend to hold said member back, applying a braking torque. Member 66 has to be driven to keep turning. This knowledge will be applied hereafter.

When the workpiece has profiles other than involutes of a circle, the instantaneous axis (37) of the mesh between tool and workpiece is preferably assumed. The path of contact and surface of action are then determined in known manner by normally projecting the instantaneous axis to the known tooth surface of the workpiece, in different turning positions thereof. The said projections are lines of the surface of action. The tooth shape of the tool is then determined from the surface of action.

Method and Apparatus

The novel tool can be used with or without positive timing. It simplifies positive timing because the tool axis and the axis of the workpiece are parallel, and there is no additional reciprocatory motion to complicate the drive.

The same tool works both sides of the teeth of the workpiece. Preferably both sides of the teeth are simultaneously operated on, especially so in a shaving operation. With such simultaneous operation a feed motion depthwise of the teeth is effected between the tool and workpiece to a final position in which both sides of the teeth are finished. When a tool acts only on one side of the teeth at a time it is made to clear the opposite side, and no depthwise feed is required. The feed may be in effect about the rotational axis of the tool or of the workpiece.

Broadly the method comprises running the novel tool and a workpiece in mesh so that profile sliding is achieved at all contact points, even though the axes of the tool and workpiece lie in a common plane. When positive timing is used, as preferred, together with feed depthwise of the teeth, there is a timing problem as will now be described with FIG. 10. This figure diagrammatically shows the external member 73 with axis 74 in full-depth engagement with an internal member 75 indicated by its body portion and by some of its teeth 75'. The dot and dash circles 76, 77 indicate a pair of timing gears by their pitch circles, gear 76 being coaxial and rigid with the external member 73. Let it be assumed as an example that the feed motion is imparted to the external member, so that its axis is displaced from a position 74' to the full-depth position 74. The displacement is small and is very much exaggerated in the drawing.

During this displacement the gear 76 rolls on its mating timing gear 77, so that the external member 73 is turned as it is fed in. When we consider the horizontal and vertical lines 78, 79 of the external member in the full-depth position, these same lines are in the dotted positions 78', 79' respectively when the axis is at 74', if no correction is used. According to the invention the timing of the gears is changed simultaneously with the depth feed, so that member 73 is fed in without change of angle, in complete alignment with the tooth spaces of the internal member 75. How this may be accomplished will be described with FIG. 9.

In the embodiment illustrated the external member 73 is the gear to be perfected and the internal member 75 is the tool. The principles apply however also with an external tool and an internal gear.

Gear 73 is secured to a vertical work spindle 73' rotatably mounted on a slide 80 that is movable along guides 81 in a direction perpendicular to the drawing plane of FIG. 9. The internal tool 75 is secured to a spindle 75' rotatably mounted on a slide 82, with its axis vertical and parallel to the axis of the work spindle. Slide 82 is adjustable axially of spindle 75' along ways 83 provided on a cross-slide 84. The latter is adjustable by a screw 85 along ways 86 provided on the upper portion 87 of the machine frame. The drive is from a counter shaft 88 that receives motion for instance from a motor 90 coaxial therewith through a gear coupling 91.

The work spindle 73' is connected with the counter shaft 88 by a pair of helical gears 92, 93. Gear 93 comprises two parts, of which one is rigid with the work spindle 73' while the other is urged by resilient means (not shown) to turn relatively thereto about the gear axis, so that the two parts contact the mating teeth on opposite sides, effecting a preload and eliminating backlash. The tooth ratio of the pair 92, 93 is preferably kept an even ratio, such as 1:1 or 1:2.

Another pair of gears 94, 95, here shown as spur gears with straight teeth, connect the counter shaft 88 and the tool spindle 75'. The overall ratio of the two gear pairs equals the tooth ratio of the external and internal members 73, 75. With a 1:1 tooth ratio of gears 92, 93, the tooth ratio of gears 94, 95 should equal the tooth ratio of the members 73, 75.

The gears 94, 95 are change gears replaceable for different jobs, while the gears 92, 93 are kept unchanged.

Slide 82 is withdrawn for unloading and loading, and again advanced to the operating position shown. Cross-slide 84 serves for setting the axis of the internal member 75 to the required distance from the axis of the external member 73 in the final position of feed. Slide 80 serves to effect the depth feed required.

The depth feed may be operated by a screw rigid with worm 96 by hand or mechanically. Worm 96 engages a helical gear segment 97 rigid with a screw 98. Screw 98 engages a nut 99 rigidly secured to the lower portion 87' of the machine frame. When the depth feed is operated the turning worm 96 turns screw 98 in the stationary nut 99, thereby raising the screw and with it the bearing 100 contained therein. The entire counter shaft 88 with gears 92, 94 is raised with it. This displacement causes an additional turning motion of gear 93 and of the work spindle 73' in the required direction, while leaving the turning position of the tool spindle 75' unaffected. The required amount of the turning motion is attained by proper selection of the lead of worm 96, that of the screw 98, etc., as readily understood.

In this way the said additional turning motion is compensated and a depth feed is attained wherein the external member moves in without turning, as desired. The tool is approached equally to both sides of the gear teeth. Broadly a timing change is applied to the gear train in time with the depth feed.

The internal member 75 acts like a brake near the end of the operation, as described, so that tooth contact exists then continuously on the same side of the teeth of gears 94, 95. A slight amount of backlash in the gears 94, 95 does not affect the operation. A provision to remove this backlash, as with the gears 92, 93, is not a necessity. The change gears 94, 95 may be kept simple.

While the invention has been described in connection with several different embodiments thereof, it will be understood that it is capable of various further modifications, and uses, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

I claim:

1. A rotary gear-shaped tool for perfecting a gear by rotation in mesh with the gear in the manner of an external gear and an internal gear meshing with each other and with their axes lying in a common plane, whereby a rolling circle rigid with said tool rolls without sliding on a circle rigid with said gear, one of said circles contacting the other internally, said tool having teeth and tooth spaces alternating with one another around its periphery, the thickness of the teeth of said tool at midheight being less than the width of the tooth spaces of said tool at midheight and being less than the width of the tooth spaces of said gear, and said tool having tooth sides conjugate to the tooth sides of said gear, and said tool being adapted to mesh with said gear with the teeth of said tool disposed entirely inside of said rolling circle and at a distance therefrom.

2. A rotary gear-shaped tool according to claim 1, that is shaped to run with a gear to be perfected with its axis parallel to the axis of said gear, said tool having teeth of constant thickness from end to end and extending along a cylindrical surface coaxial with said tool.

3. A rotary gear-shaped tool according to claim 1, wherein said tool is a shaving tool having grooves on its tooth surfaces, said grooves being angularly disposed to planes perpendicular to the tool axis.

4. A rotary gear-shaped tool according to claim 1, wherein said tool is an abrading tool.

5. A rotary gear-shaped externally-toothed tool for perfecting an internal gear in a process wherein said tool meshes and runs with the internal gear to be perfected while the axis of said tool lies in a common plane with the axis of said internal gear, whereby a circle rigid with said tool rolls without sliding on a circle rigid with said internal gear, the contact point of said circles lying at a larger distance from the axis of said tool than the outside surface of its teeth, said tool having working portions disposed on opposite sides of its teeth, the tooth width of said tool at the top ends of its teeth being smaller than the space width of said gear at the depth engaged by said top ends, the sides of the teeth of said tool being conjugate to the tooth sides of said gear, and the tooth number of said tool being more than half the tooth number of said internal gear.

6. A rotary gear-shaped tool according to claim 5 for perfecting internal gears, wherein the width of the teeth of said tool at the tooth ends is less than half the width of the tooth bottom of said tool between radially extended side profiles of its teeth.

7. A rotary gear-shaped tool according to claim 5 for perfecting internal gears, wherein the top ends of the teeth of said tool lie in a cylindrical surface coaxial with said tool and wherein a tooth of the tool clears the side profiles of the gear teeth when the center line of said tooth coincides with the center line connecting the centers of the tool and gear, and comes closest to said side profiles at the outer end of said tooth, while both sides of the teeth of said gear contact different teeth of said tool.

8. A rotary gear-shaped internally-toothed tool for perfecting external gears in a process wherein said tool meshes and runs with the external gear to be perfected while its axis lies in a common plane with the axis of said external gear, whereby a circle rigid with said tool rolls without sliding on a circle rigid with said external gear, the contact point of said circles lying at a larger distance from the tool axis than the tooth bottoms of said internal tool, said tool having working portions disposed on its tooth sides, and the tooth number of said tool being less than double the tooth number of said external gear.

9. An internal rotary gear-shaped tool for perfecting external gears, according to claim 8, wherein the width of the teeth of the tool at the tooth ends is less than a quarter of its space width at said end.

10. A rotary gear-shaped tool according to claim 8, wherein a tooth space of the tool clears the side profiles of the gear tooth therein when the center line of said tooth space coincides with the center line connecting the centers of said tool and gear, and comes closest to said side profiles at the outer end of said gear tooth, while both sides of the teeth of said gear contact said tool in different tooth spaces thereof.

11. A rotary gear-shaped tool for perfecting a gear in a process wherein the tool is rotated in mesh with the gear with the axis of rotation of the tool in a plane containing the axis of the gear, and wherein a rolling circle rigid with said tool rolls without sliding on a circle rigid with said gear, the side tooth surfaces of said tool being conjugate to the side tooth surfaces of said gear and said tool having its teeth disposed at a distance from its said rolling circle to achieve sliding throughout its engagement with said gear, the tooth thickness of said tool at midheight of its teeth being smaller than its space width there, and the tooth width of said tool at the top ends of its teeth being smaller than the space width of said gear at the depth engaged by the top ends of the teeth of the tool.

References Cited in the file of this patent

UNITED STATES PATENTS

| 616,648 | Beale | Dec. 27, 1898 |
| 1,558,704 | Miller | Oct. 27, 1925 |
| 1,772,635 | Olson | Aug. 12, 1930 |
| 2,123,717 | Dalzen | July 12, 1938 |
| 2,126,178 | Drummond | Aug. 9, 1938 |
| 2,207,438 | Miller | July 9, 1940 |
| 2,228,968 | Miller | Jan. 14, 1941 |
| 2,267,692 | Dalzen | Dec. 23, 1941 |
| 2,295,148 | Witham | Sept. 8, 1942 |
| 2,305,144 | Dalzen | Dec. 15, 1942 |
| 2,317,161 | Witham | Apr. 20, 1943 |
| 2,504,578 | Pelphrey | Apr. 18, 1950 |
| 2,669,905 | Miller | Feb. 23, 1954 |

FOREIGN PATENTS

| 450,309 | Germany | Oct. 6, 1927 |